(12) United States Patent
Currivan et al.

(10) Patent No.: US 7,916,816 B2
(45) Date of Patent: Mar. 29, 2011

(54) HARDWARE ALLOCATION IN A MULTI-CHANNEL COMMUNICATION ENVIRONMENT

(75) Inventors: Bruce J. Currivan, Dove Canyon, CA (US); Thomas J. Kolze, Phoenix, AZ (US); Loke K. Tan, Newport Coast, CA (US); Hanli Zou, Rancho Santa Margarita, CA (US); Jonathan S. Min, Fullerton, CA (US)

(73) Assignee: Broadcom Corporation, Irvine, CA (US)

( * ) Notice: Subject to any disclaimer, the term of this patent is extended or adjusted under 35 U.S.C. 154(b) by 954 days.

(21) Appl. No.: 11/798,439

(22) Filed: May 14, 2007

(65) Prior Publication Data

US 2007/0263754 A1    Nov. 15, 2007

Related U.S. Application Data

(60) Provisional application No. 60/799,679, filed on May 12, 2006.

(51) Int. Cl.
*H04B 1/10* (2006.01)
*H03K 5/159* (2006.01)

(52) U.S. Cl. .................. 375/349; 375/229; 375/350

(58) Field of Classification Search .......... 375/232, 375/260, 316, 349, 229, 350; 370/464, 465; 455/168.1, 189.1, 303; 708/322, 323
See application file for complete search history.

(56) References Cited

U.S. PATENT DOCUMENTS

| | | | | |
|---|---|---|---|---|
| 5,243,629 | A * | 9/1993 | Wei | 375/260 |
| 5,262,972 | A * | 11/1993 | Holden et al. | 708/316 |
| 6,621,862 | B1 * | 9/2003 | Dabell | 375/232 |
| 6,704,372 | B2 * | 3/2004 | Zhang et al. | 375/316 |
| 6,999,508 | B1 * | 2/2006 | Redfern | 375/232 |
| 2004/0218692 | A1 * | 11/2004 | McNeely | 375/316 |

OTHER PUBLICATIONS

Keshab K. Parhi, "VLSI Digital Signal Processing Systems: Design and Implementation," Chapter 8, John Wiley and Sons, 1999.
Crochiere et al., "*Multirate Digital Signal Processing*," Prentice-Hall, 1983.
Currivan et al., "A Complex Adaptive Equalizer ASIC," *Proceedings of the Third IEEE International Symposium on Personal, Indoor and Mobile Radio Communications*, Oct. 19-21, 1992, pp. 52-58.
Peled et al., "A New Hardware Realization of Digital Filters," *IEEE Transactions on Acoustics, Speech, and Signal Processing*, vol. 22, Issue 6, Dec. 1974, pp. 456-462.
"Data Over Cable Service Interface Specifications DOCSIS 3.0, Physical Layer Specification, CM-SP-PHYv3.0-103-070223," Cable Television Laboratories, Inc., Feb. 23, 2007.

* cited by examiner

*Primary Examiner* — Betsy L Deppe
(74) *Attorney, Agent, or Firm* — Sterne, Kessler, Goldstein & Fox P.L.L.C.

(57) ABSTRACT

Hardware allocation techniques are described for use in a multi-channel communication environment. The techniques may be used to reduce the number of gates needed for processing and/or to improve the efficiency and/or speed of a communication system. For example, resources that are under-utilized may be removed or allocated to another operation or user. In an exemplary implementation, a receiver includes a plurality of signal processing modules corresponding to respective channels and a hardware allocation module. The hardware allocation module allocates resources in the signal processing modules based on utilization of at least one of the resources.

32 Claims, 4 Drawing Sheets

HARDWARE ALLOCATION IN A MULTI-CHANNEL COMMUNICATION ENVIRONMENT

CROSS-REFERENCE TO RELATED APPLICATION

This application claims the benefit of U.S. Provisional Application 60/799,679, filed May 12, 2006, which is incorporated herein by reference in its entirety.

BACKGROUND OF THE INVENTION

1. Field of the Invention

The present invention relates generally to communication systems, and more specifically to allocation of hardware in a multi-channel communication environment.

2. Related Art

A point-to-multipoint communication system includes a network that supports bidirectional data communication between a central entity and multiple remote entities. Example point-to-multipoint communication systems include but are not limited to cable modem systems, fixed wireless systems, and satellite communication systems. A central entity may be any of a variety of communication devices, including but not limited to a cable modem termination system (CMTS), a satellite, or a cellular base station. A remote entity may be any of a variety of communication devices, including but not limited to a cable modem, a settop box, a cable gateway, a portable computing device, or a cellular telephone.

The central entity and the multiple remote entities each include a receiver and a transmitter. The transmit and receive functions of an entity are often combined using a transceiver. The communication path from a transmitter of the central entity to a receiver of a remote entity is typically referred to as the downstream, while the communication path from a transmitter of the remote entity to a receiver of the central entity is typically referred to as the upstream.

In modem point-to-multipoint communication systems, advances in communication technology (e.g., video on demand (VOD), high-definition television (HDTV), digital services, expanding analog channel lineups, etc.) are requiring increasingly more bandwidth, which may lead to deficiencies in channel capacity, especially with respect to downstream transmissions. Channel bonding is one technique that may be employed to help alleviate downstream bandwidth issues. Channel bonding enables packets of data to be transmitted via any one or more of the channels that are bonded.

However, conventional channel bonding techniques often require substantially more hardware than a conventional single-channel technique.

For instance, an N-channel receiver may require approximately N times the hardware that a single-channel receiver requires. Moreover, conventional channel bonding techniques often lack efficient hardware utilization. For example, a receiver component that is capable of operating at a certain frequency may be operated at a fraction of that frequency based on a limited need.

Accordingly, systems and methods are needed that address one or more of the aforementioned shortcomings of conventional channel bonding techniques.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the pertinent art(s) to make and use the invention.

In the drawings, like reference numbers indicate identical or functionally similar elements. Additionally, the leftmost digit(s) of a reference number identifies the drawing in which the reference number first appears.

DETAILED DESCRIPTION OF THE INVENTION

This specification discloses one or more embodiments that incorporate the features of this invention. The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover,.such phrases are not necessarily referring to the same embodiment. Furthermore, when a particular feature, structure, or characteristic is described in connection with an embodiment, it is submitted that it is within the knowledge of one skilled in the art to effect such feature, structure, or characteristic in connection with other embodiments whether or not explicitly described.

I. Exemplary N-Channel Receiver

Figure 1:
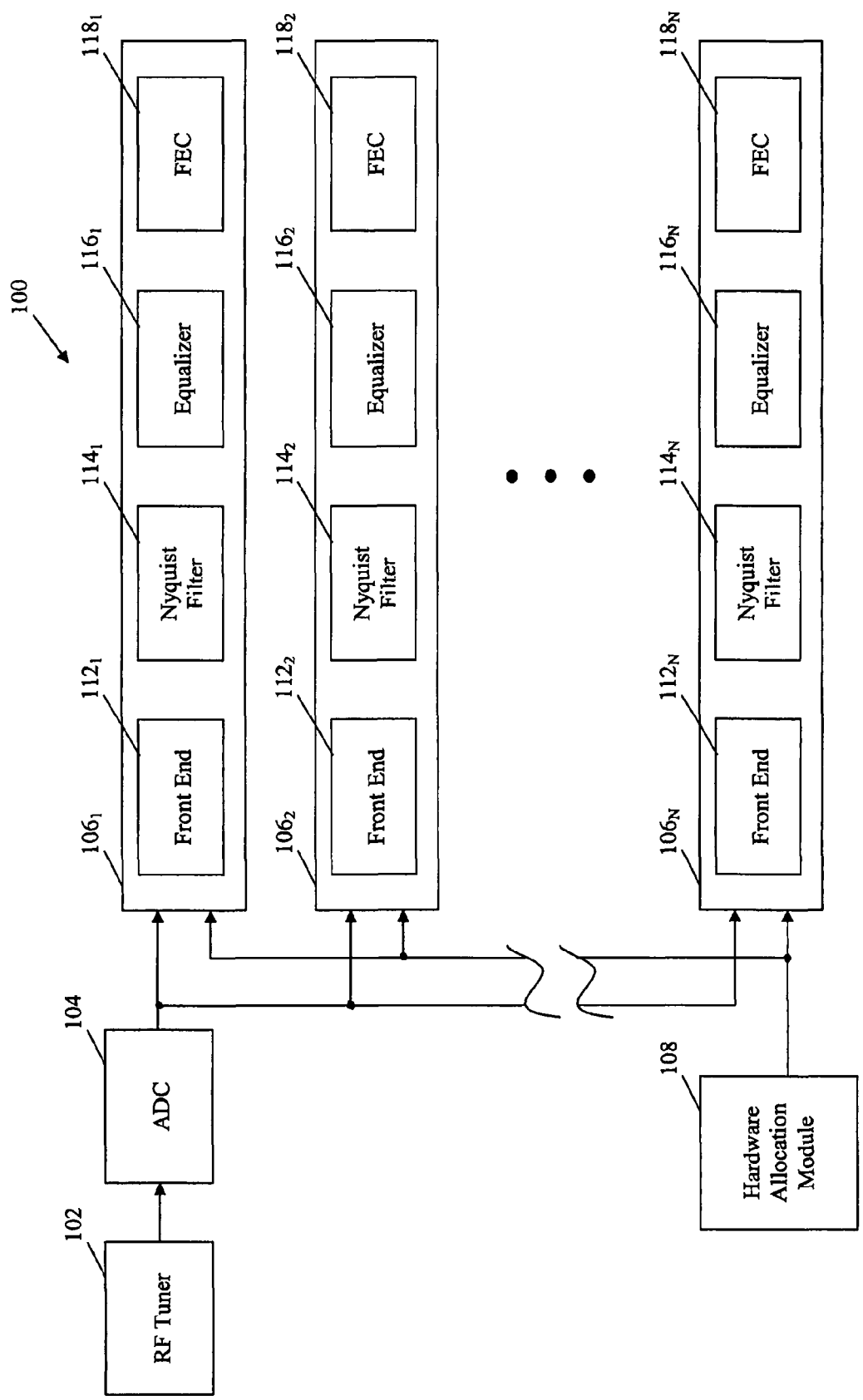
FIG. 1 is a block diagram of an exemplary N-channel receiver according to an embodiment of the present invention.

FIG. 1 is a block diagram of an exemplary N-channel receiver 100 according to an embodiment of the present invention. N-channel receiver 100 includes a radio-frequency (RF) tuner 102, an analog-to-digital converter (ADC) 104, and signal processing modules $106_1$-$106_N$ corresponding to respective channels. RF tuner 102 receives multi-channel RF signals from a medium, such as cable, optical fiber, air, etc., and tunes the multi-channel RF signals to baseband. ADC 104 samples and digitizes the resulting baseband signals. ADC 104 is relatively wideband and operates at a relatively high frequency, as compared to an ADC configured for single-channel operation, in order to accommodate the multi-channel baseband signals. In some embodiments, ADC 104 includes a plurality of ADCs. For instance, ADC 104 may include one ADC per channel or any other combination of ADCs and channels. The digitized baseband signals are effectively divided among signal processing modules $106_1$-$106_N$, such that each signal processing module 106 processes a respective baseband signal.

In FIG. 1, each signal processing module 106 includes a front end 112, a Nyquist filter 114, an equalizer 116, and a forward error correction (FEC) module 118. Each front end 112 selects a respective one of the digitized baseband signals received from ADC 104. For example, front end $112_1$ selects a first baseband signal corresponding to a first channel, front end $112_2$ selects a second baseband signal corresponding to a second channel, etc. Each front end 112 may include any of a variety of components, including but not limited to a filter, a carrier adjustment module, an automatic gain control (AGC) module, etc.

Each Nyquist filter 114 manipulates the spectrum associated with a respective baseband signal, for example, by performing mathematical operations. In the embodiment of FIG. 1, Nyquist filter 114, performs mathematical operations on the first baseband signal, Nyquist filter 114₂ performs mathematical operations on the second baseband signal, etc. Nyquist filters 114 may be implemented as finite impulse response (FIR) filters, though the scope of the present invention is not limited in this respect. For instance, one or more of Nyquist filters 114 may be implemented as infinite impulse response (IIR) filter(s).

Each equalizer 116 compensates for signal variations caused by the channel with which it is associated. Signal variations include but are not limited to magnitude, phase, and frequency variations. For example, equalizer $116_1$ compensates for a variation of the first baseband signal caused by the first channel, equalizer $116_2$ compensates for a variation of the second baseband signal caused by the second channel, etc. Additional equalizers may be employed to remove the interference of the channels on one another, such as may be caused by adjacent channel interference (ACI) and/or image interference. Further additional components may be employed to mitigate interference, such as narrowband interference.

FEC modules 118 are shown in FIG. 1 to illustrate that the multi-channel RF signals received by RF tuner 102 may be encoded in accordance with an FEC algorithm. An FEC algorithm incorporates redundant information into the multi-channel RF signals to facilitate detection and correction of errors. Each FEC module 118 decodes a respective baseband signal. For example, FEC module $118_1$ decodes the first baseband signal, FEC module $118_2$ decodes the second baseband signal, etc.

Hardware allocation module 108 allocates hardware in one or more of signal processing modules $106_1$-$106_N$ in accordance with any one or more of the hardware allocation techniques described in section III below. Some of the techniques may be performed in the absence of hardware allocation module 108. For example, signal processing modules $106_1$-$106_N$ may be configured to perform such techniques independently of hardware allocation module 108. Accordingly, N-channel receiver 100 need not necessarily include hardware allocation module 108.

II. Exemplary N-Channel Environments

Several exemplary environments will now be discussed to provide a context in which the hardware allocation techniques may be described in section III below. The hardware allocation techniques are not limited to these exemplary environments. To the contrary, persons skilled in the relevant art(s) will recognize that the hardware allocation techniques are applicable to any multi-channel communication environment.

a. Standardized Communication Environment

As a first example, any of the hardware allocation techniques described below may be performed in accordance with a standardized communication protocol. Such protocols are established by standards bodies, including but not limited to Cable Television Laboratories, Inc. (CableLabs®), European Committee for Electro-technical Standardization (CENELEC™), Electronic Industries Alliance (EIA™), European Telecommunications Standards Institute (ETSI™), Internet Engineering Task Force (IETF™), International Organization for Standardization (ISO®), and International Telecommunications Union (ITU™).

One example of a standardized communication protocol is a Data Over Cable Service Interface Specification (DOCSIS™) protocol. DOCSIS™ refers to a group of specifications published by CableLabse that define industry standards for cable headend and cable modem equipment. In part, DOCSIS™ sets forth requirements and objectives for various aspects of cable modem systems including operations support systems, management, data interfaces, as well as network layer, data link layer, and physical layer transport for data over cable systems. The current version of the DOCSIS™ specification is version 3.0, and includes the DOCSIS™ Physical Layer Specification CM-SP-PHYv3.0-I03-070223 (hereinafter "DOCSIS™ Physical Layer Specification"), the entirety of which is incorporated by reference herein. DOCSIS™ 3.0 allows N channels to be bonded at the media access (MAC) layer, providing an equivalent data throughput of N channels to a user, though the user perceives a single channel.

Figure 2:
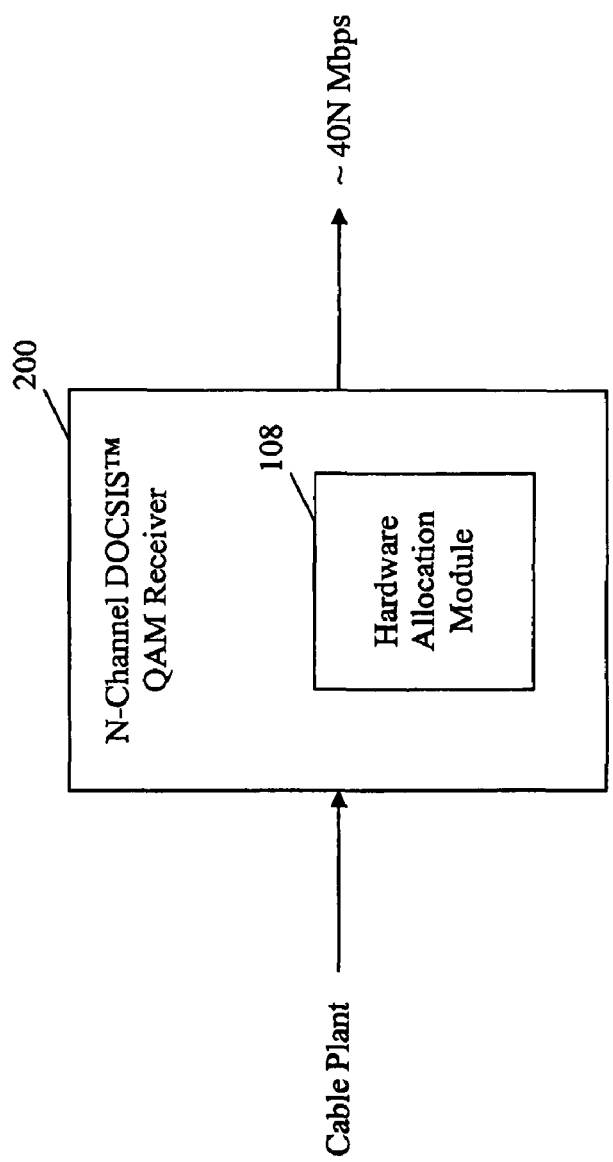
FIG. 2 is an N-channel DOCSIS™ cable modem quadrature amplitude modulation (QAM) receiver according to an embodiment of the present invention.

Some of the techniques are described with reference to the DOCSIS™ cable modem environment for illustrative purposes. For example, FIG. 2 illustrates an N-channel DOCSIS™ cable modem quadrature amplitude modulation (QAM) receiver 200 in which hardware allocation techniques may be employed in accordance with an embodiment of the present invention. In FIG. 2, receiver 200 is shown to include a hardware allocation module 108. However, it will be recognized that receiver 200 need not necessarily include hardware allocation module 108. For instance, receiver 200 may be configured to allocate hardware in absence of hardware allocation module 108.

In FIG. 2, receiver 200 receives N QAM channels and provides at its output approximately 40N mega-bits-per-second (Mbps) of data. An output data rate of 40N Mbps is provided for illustrative purposes. The actual output data rate of receiver 200 depends on a variety of factors, including the hardware allocation techniques employed.

b. Adaptive Equalization Environment

Any of the techniques can be used to facilitate adaptive equalization, the functionality of which may be implemented in one or more of the signal processing modules. For example, the adaptive equalization functionality may be incorporated into one or more of front ends $112_1$-$112_N$, Nyquist filters $114_1$-$114_N$, and/or equalizers $116_1$-$116_N$.

For illustrative purposes, consider an exemplary decision feedback equalizer having sixteen symbol-spaced feedforward (FFE) taps and twenty-four feedback (DFE) taps. A conventional implementation of the filter portion of the equalizer requires one complex multiplication operation per tap per QAM symbol, for example. Each complex multiplication operation consists of four real multiplication operations and two addition operations. The least mean squares (LMS) update portion of the equalizer, if updated on each clock, requires the same processing rate as the Nyquist filter. A total of (16+24)*4*2=320 real multiplication operations per symbol are required for the FIR filter and the LMS update for a single QAM channel. At a symbol rate of 5 mega-symbols-per-second (Msps), this equates to 1.6 billion multiplication operations per second for one channel.

In an environment having multiple channels, the greater number of channels may be expected to correspond with a greater computational load.

For instance, in a conventional implementation, the computational load is replicated on each channel. Thus, in the example above, a conventional 16-channel receiver requires (16+24)*4*2*16=5120 real multiplication operations per symbol, corresponding with 25.6 billion real multiplication operations per second. According to embodiments of the present invention, the computational load per channel (and associated heat generation) may be reduced by incorporating any one or more of the hardware allocation techniques described below.

III. Exemplary Hardware Allocation Techniques

In this section, techniques are described for allocating hardware in a multi-channel communication environment, in accordance with embodiments of the present invention. The techniques are described with continued reference to exemplary N-channel receiver 100 described above in reference to FIG. 1. The invention, however, is not limited to that embodiment.

a. Use Micro-sharing of Resources

A first embodiment of the present invention uses micro-sharing of resources to perform hardware allocation. Referring back to FIG. 1, resources may be shared in a single signal processing module 106 or among multiple signal processing modules $106_1$-$106_N$, for example, in accordance with the first embodiment. For instance, adaptive equalization operations often utilize multipliers. Such multipliers may be shared on a bit-slice basis. For example, consider a set of 16×16 multipliers being used to compute the FIR filter output of an adaptive equalizer. For illustrative purposes, assume a symbol rate of 5 Msps, four real multiplication operations per symbol per tap, forty (40) taps per channel, and sixteen QAM channels. This 16-channel receiver example requires (16+24)*4*16=2560 real multiplication operations per symbol, corresponding with 12.8 billion real multiplication operations per second. If a single multiplier is capable of operating at 400 MHz, for example, then thirty-two multipliers are required to accomplish the above processing for sixteen channels.

It may appear that if thirty-two multipliers are operated continuously at 400 MHz, the loading of the system has been optimized. However, the bit efficiency of the multiplications should be taken into consideration. That is, although 16×16 bit multipliers are used in this example, the numbers being multiplied may not necessarily occupy the full sixteen bits. For example, an adaptive equalizer may have a single "main tap", a few other taps with nominal energy, and other taps with nearly zero values. In this example, the full precision of the multiplier is not needed for the adaptive equalizer coefficients. For instance, more precision may be needed for the main tap than for the other taps. Less precision may be needed for the taps having nearly zero energy than for the taps having nominal energy. In this example, precision may be adaptively changed. For instance, if a relatively large echo is detected M bits away, then a presumption may be made that the corresponding coefficient is large. Accordingly, more precision (more bits) may be used for the corresponding error signal.

In another example, the complex data typically has a probability distribution that approximates independent Gaussian random variables on each tap, and on each real/imaginary dimension. For instance, each I or Q data component is likely to fall in a region around zero. In this example, the full precision of the multiplier is not needed for the data path. In these examples, the 16×16 multipliers may not be fully utilized because at least some of the multiplier resources are being used to multiply fields of leading zeros.

To better utilize the multiplier resources, the multipliers may be effectively divided into bit slices, which may be of any size. For instance, hardware allocation module 108 may configure the multipliers to perform operations on bit slices of numbers, rather than the numbers themselves. In this example, the slices may be of any size from 1 to 16 bits. For illustration, a slice width of four bits is selected, such that each input to the multiplier consists not of a single 16-bit number, but of four 4-bit fields. In one aspect, an M-bit multiplier is configured to perform a multiplication operation on L-bit operands, where L<M. In another aspect, L may be defined using a relationship between M and another integer (e.g., L=M/P, where P is an integer). For instance, referring to the example above, M=16 and P=4, such that the 16-bit multipliers are configured to perform multiplication operations using 4-bit multiplicands.

According to the first embodiment, an arbitration mechanism may be employed, such that each arithmetic multiplication (or "user") that needs to be serviced requests a number of slices from a multiplier. Slices that are not needed by the user are available for another user. For example, assume on a given clock cycle, in a given QAM channel, on a given equalizer tap, that a 6-bit coefficient value and 9-bit data value need to be multiplied. The tap or user requests a 6×9 multiplication. The multiplier may be configured to use 2 slices on its first input (i.e., 8 bits, which handles the 6-bit coefficient) and 3 slices on its second input (i.e., 12 bits, which handles the 9-bit coefficient). The remaining slices of the multiplier (2 slices on its first input and 1 slice on its second input) are free to be assigned to another user on that clock cycle.

The gain that may be realized using this technique is often referred to as statistical multiplexing gain. Such gain may be quantified, for example, by determining the distribution of number sizes at the multiplier inputs by observing the arithmetic computations that are performed in a realistic worst-case situation. For instance, it may be determined that if the number of 16×16 multipliers is reduced from thirty-two to sixteen, then the multiplier resources are capable of fulfilling multiplication requests 99.9% of the time. The remaining 0.1% of the time, the multiplier resources are overwhelmed in this example, meaning that the multiplier resources are not capable of simultaneously providing all users with the number of slices they have requested.

The "resource overflow" scenario, in which the multiplier resources are overwhelmed, may be addressed in any of a variety of ways. In a first example, hardware allocation module 108 reduces the number of slices allocated to the users in such a way as to fulfill the number of computations requested, but with reduced precision (i.e., increased quantization noise) for some users. The reduction may be the same for all users, or it may differ from user to user. For instance, hardware allocation module 108 may selectively reduce the number of slices allocated to the users. Reducing the number of allocated slices may not have a significant adverse effect. For instance, a relatively small, momentary increase in the quantization noise floor may not be noticeable at the system level.

In a second example, some multiplications are deferred until a subsequent clock cycle (e.g., the next clock cycle or beyond), at which time it may be expected that statistically less demand may be placed on the resources. Buffering may be utilized to account for any variable delay resulting from the deferral of the computations.

In a third example, priorities may be applied to respective multiplication requests. For instance, fairness criteria may be applied to determine which users are denied the full number of slices they requested. Some users may be less sensitive than others to reduced precision. For example, a user who requests 9-bit multiplication (three slices), but is granted only eight bits (two slices), will not be as adversely affected as a user who requested a 12-bit multiplication (three slices), but is granted only eight bits (two slices). In the former case, one bit of precision is lost; whereas, in the latter case, four bits of precision are lost. Accordingly, the 12-bit multiplication request may be assigned a higher priority than the 9-bit multiplication request.

It should be noted that loss of precision on the data input to the multiplier may have a greater negative effect than loss of precision on the coefficient input to the multiplier, or vice versa, in a given application. Also, if a user has a multiplicand which has all zeros in the least significant slice, hardware allocation module 108 can manage requests of the user to not request this slice. Hardware allocation module 108 may be informed that such a slice is requested and reduce the priority of keeping this slice if there is high demand. If in the implementation the all-zero slice is not requested, hardware allocation module 108 may be informed and place a relatively high priority on maintaining the least significant slice of the request. For instance, the least significant slice actually requested may contain bits of higher significance than would have typically been requested. In general, hardware allocation module 108 may take into account the significance (in the sense of quantization value) of the requested slices. In circumstances of high demand for resources, hardware allocation module 108 may drop those slices that carry the least significance to the overall result.

Figure 3:
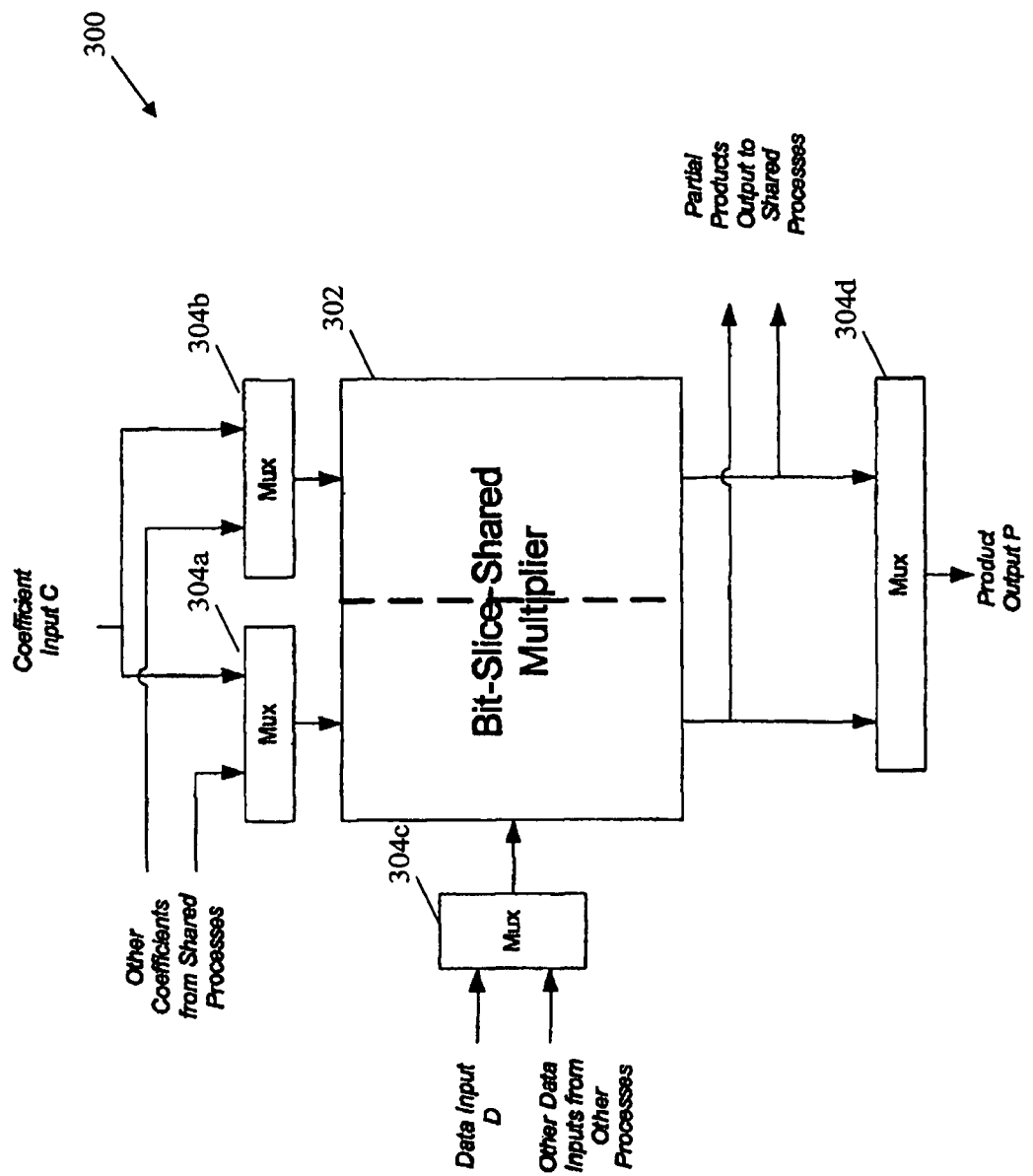
FIG. 3 shows an exemplary bit-sliced multiplier in accordance with an embodiment of the present invention.

FIG. 3 shows an exemplary bit-sliced multiplier 302 in accordance with an embodiment of the present invention. Bit sliced multiplier 302 multiplies data samples D times coefficient samples C, producing product samples P. In FIG. 3, the 16×16-bit multiplier 302 is sliced in half only along the coefficient dimension, so that each coefficient is divided into two parts, $C=2^8*C_1+C_0$. Each half of the coefficient can be shared among various processes using multiplexers 304a and 304b. The data input D can also be shared among processes using multiplexer 304c, though in this example the data input D is not divided into slices. The product P includes two partial products corresponding to $D*C_1$ and $D*C_0$, respectively. The product P is available for use by the shared processes as the output of multiplexer 304d. The two partial products are available as the respective outputs of bit sliced multiplier 302.

When multiplying a data word by a coefficient, a determination may be made as to the number of ones in each coefficient. Each one represents an addition. A data word may be effectively slid left or right, depending upon where the one is in the coefficient, and added to other versions of the data word that are slid left or right, depending upon where the ones are. For instance, the number of ones in all of the equalizer coefficients and all of the channels may indicate the number of addition operations that need to be performed.

To illustrate this point, consider the multiplicands W=1001 and X=1010. Because W includes two ones, only two words need to be added together. Thus, one addition is necessary to multiply these multiplicands. Now consider the multiplicands W=1111 and X=1010. Because W includes four ones, four words need to be added together, necessitating three word additions.

In this example, if there is one channel where 50% of the bits in the coefficients are ones, then the chance of having all of the bits be one may be so remote that not all of the additions need to be accommodated. For instance, if 50% of the bits are ones, then perhaps the multiplication capability can be reduced by 50% without a substantially negative impact on performance. If more than 50% of the bits in the coefficients are ones, then two's complement arithmetic may be used to switch the respective numbers of ones and zeros. For instance, if 90% of the coefficients have a one, the ones and zeros may be switched using two's complement arithmetic to provide 10% of the coefficients having a one. Thus, utilizing two's complement arithmetic may ensure not having more than 50% ones. It should be noted that a string of ones is as significant as a string of zeros, considering that two's complement arithmetic may be used.

b. Use Less Precision in Error Signal

In a second embodiment, error signals are adapted to use less precision. For example, a typical error signal may have thirteen or more bits.

The error signal may be quantized to four or fewer bits, for example, without significant performance degradation. The equalizer error signal is computed in the least mean squares (LMS) algorithm as the equalizer output minus the slicer output. The error signal may be configured to have any integer number of bits.

c. Update Equalizer Coefficients Less Than Once Per Symbol

In a multi-channel communication environment, the channel response changes at a low rate compared to the symbol rate, which may be 5 Msps, for example. According to a third embodiment, the update rate of the taps may be reduced without a significant performance degradation. For instance, the equalizer coefficients may be updated only when the coefficients are changing, less frequently when the coefficients are not changing, based on a worst-case scenario, etc.

For example, the update rate of the taps may be reduced by a factor, which can be any value (e.g., 2, 3, . . . , 10, etc.). The updates may be accumulated on every symbol, but applied only once per block of symbols. For example, an accumulated update may be applied once per 2, 3, . . . , 10, etc. symbols. In an aspect, the delta or update information may be subsampled for each coefficient. By updating equalizer coefficients less than once per symbol, less precision may provided in exchange for faster updates. The use of subsampled coefficient updates as described herein may be combined with other techniques, such as using micro-sharing of resources and/or using less precision in the error signal, as described above in respective sections III.a and III.b.

In a first aspect, a receiver is configured to utilize a relatively faster update rate during an acquisition period. In a second aspect, larger coefficients are updated more frequently than smaller coefficients. For example, hardware allocation module 108 may allocate the resources in signal processing modules $106_1$-$106_N$ more often to updating the larger coefficients. In a third aspect, larger coefficients are allocated a relatively greater share of resources (including update resources) than smaller coefficients.

According to the third embodiment, the accumulated coefficient updates may be applied in any manner. For example, the updates may be applied based on a fixed sequential order, an order that is based on the respective magnitudes of the updates, a predetermined frequency, a threshold, etc. The coefficients canbe monitored individually, in groups, all together, or not at all, depending on the manner in which the updates are applied.

Any of a variety of comparisons can be made based on a threshold to determine whether an update is to be applied. For example, updates may be accumulated until the accumulated change reaches the threshold. In another example, the magnitude of the larger of the I or Q component is compared to the threshold. In yet another example, the updated coefficient may be compared to the existing coefficient, which acts as the threshold. A comparison may be as simple as examining the most-significant bit(s) of updates, though more complex comparisons may be performed. The threshold can be adjusted to control the rate at which updates are implemented (i.e., applied).

In one aspect, hardware is allocated to update the coefficients and apply them all at once (i.e., all new coefficients for symbol "n+1" compared to those used for symbol "n") as a "block" of new coefficients. In another aspect, hardware is allocated to update one new coefficient for each received symbol.

Variations and combinations of the subsampled update approaches described herein are envisioned. For example, hardware may be allocated to update one coefficient every $N_1$ received symbols, to update M coefficients as a block every $N_2$ received symbols, or to update all coefficients every $N_3$ received symbols, where $N_1$, $N_2$, and $N_3$ are integers and M is an integer greater than one. The latter approach may be referred to as full block processing, while the first approach may be referred to as serial subsampled processing. The second approach is a combination of the first and third approaches.

All of these approaches have their own respective advantages. For example, the first approach combines well with techniques for the strategic selection of filter structures, which is described below in section III.d. The third approach combines well with a technique for using micro-sharing of resources, which is described in section III.a above. The second approach combines well with a combination of the techniques described in sections III.a and III.d.

These examples are provided for illustrative purposes and are not intended to limit the scope of the present invention. Persons skilled in the relevant art(s) will recognize that any of the techniques and approaches described herein may be combined. For instance, the use of serial subsampling, as described with reference to the first approach above, does not preclude combination with resource sharing, as described in section III.a, because, for example, it is not necessary to allocate all of the resources needed for multiplying all the coefficients all the time. For example, a reserve may be created to allow a changed coefficient to "grab" more resources (i.e., more "1"s in the new coefficient). For future coefficient updates, hardware allocation module 108 may attempt to "give back" some resources, even in exchange for some small quantization error. Any of a variety of techniques may be employed to enable a system to learn which allocations of resources are working better than others, and to refine the allocations. Examples of such learning techniques include, but are not limited to, neural networks and fuzzy logic based approaches d. Use Strategic Selection of Filter Structures Depending on which of the hardware allocation techniques are utilized, certain filter structures may be preferable to others. According to a fourth embodiment, the structure of filters, such as Nyquist filters $114_1$-$114_N$ in FIG. 1, may be selected based on the hardware allocation techniques used. FIR and IIR filters can be strategically selected and/or custom designed to improve performance of a receiver, such as receiver 100 of FIG. 1.

Some exemplary FIR filter structures include but are not limited to a canonical structure, an inverse canonical structure, and a scanned multiplier-accumulator structure. The canonical structure includes a delay line, a plurality of coefficient multipliers, and an adder tree. The inverse canonical structure includes a plurality of coefficient multipliers and a pipelined adder. In the inverse canonical structure, the pipelining in the adder incorporates the delay line function. The scanned multiplier-accumulator structure includes a plurality of multiplier-accumulators (MACs), each of which accumulates a dot product at a given lag. In the scanned multiplier-accumulator structure, the coefficients circulate among the MACs, enabling all coefficients to pass by a single point. The coefficients may be examined and/or modified at this point. The MAC outputs are scanned to provide the dot product outputs in the correct order.

These exemplary filter structures and other filter structures are described in Currivan, B. and Flohr, M, "A Complex Adaptive Equalizer ASIC," Proceedings of the *Third IEEE International Symposium on Personal, Indoor and Mobile Radio Communications,* 1992 (PIMRC '92), 19-21 Oct. 1992, pp. 52-58, the entirety of which is incorporated herein by reference. The strategic selection of filter structures may be used in combination with other hardware allocation techniques, such as the coefficient update subsampling approach described above in section III.c.

e. Use Block Floating Point

A fifth embodiment of the present invention utilizes a block floating point technique in which a group of fixed-point arithmetic results are computed, and an exponent (i.e., a scale factor) usually of value two is maintained which applies to the entire group of fixed-point results. This technique will be described in an equalizer environment for illustrative purposes. During acquisition, an equalizer error signal may be relatively large and may not require great precision. During tracking, the equalizer error signal may be relatively small and may not require greater precision than the relatively larger equalizer error signal described with reference to acquisition. To take advantage of this situation, the equalizer may use, for example, four bits of precision on the error signal plus an additional four bits of exponent. The number of bits used for the error signal and the number of bits used for the exponent are arbitrary and can be any respective numbers. Moreover, these numbers need not necessarily be the same.

In an aspect, the error signal has a relatively large exponent during acquisition and a relatively small exponent during tracking. The result is a larger range, but less precision, during acquisition; and a smaller range, but greater precision, during tracking. Only 4-bit by 4-bit multipliers are needed for the example described above, with the exponent being applied as a shift of the resulting product.

f. Use Non-Binary Logic

In binary logic, a signal is represented by one bit. According to a sixth embodiment, non-binary logic may used, such that the signal represents a plurality of bits. For example, one example of non-binary logic is quaternary logic in which each signal represents two bits. Using non-binary logic may reduce the number of gates required to implement functions such as multipliers, though it may necessitate the development of non-binary very large scale integration (VLSI) library blocks.

g. Implement Complex Multiplications Using Three Real Multiplications

A seventh embodiment implements complex multiplications using three real multiplications, rather than four. Some illustrative techniques for implementing a complex multiplication in this manner are described in Keshab K. Parhi, *VLSI Digital Signal Processing Systems: Design and Implementation,* John Wiley and Sons, 1999, Chapter 8, the entirety of which is incorporated herein by reference. For example, the dot product that computes an output sample of a complex FIR filter involves multiplying, in a matrix sense, the data vector (assumed here to be a column vector) $x=x_r+jx_i$ times the transpose of the coefficient column vector $w=w_r+jw_i$, giving the output scalar $y=y_r+jy_i$.

A relatively straightforward implementation of the equalizer filter computes the equations $$y_r = w_r^T x_r - w_i^T x_i$$

$$y_r = w_r^T x_i + w_i^T x_r$$

In order to reduce the number of multiplications, the following algebraic transformation may be performed:

$$y_r = w_r^T x_r - w_i^T x_i + (w_i^T x_r - w_i^T x_r)$$
$$= (w_r^T - w_i^T) x_r + w_i^T (x_r - x_i)$$
$$y_i = w_r^T x_i + w_i^T x_r + (w_i^T x_i - w_i^T x_i)$$
$$= (w_r^T + w_i^T) x_i + w_i^T (x_r - x_i)$$

though the scope of the present invention is not limited in this respect.

Referring to the algebraic transformations above, the equations for the real and imaginary outputs, $y_r$ and $y_i$, contain a common term, $w_i^T(x_r-x_i)$, meaning that the real and imaginary outputs share a multiplication. Thus, four real multiplication operations per tap are replaced with three real multiplication operations per tap, thereby saving 25% of the equalizer FIR filter multiplications. In this example, more adders may be needed to perform the sums and differences of coefficients and to compute differences of data inputs. Whether utilization of this technique results in a reduction of overall complexity depends on the implementation under consideration.

h. Implement Front-End Filtering Using Multi-Rate Digital Signal Processing Techniques In accordance with an eighth embodiment of the present invention, front-end filtering is implemented using multi-rate digital signal processing techniques. For instance, any one or more of front-ends $112_1$-$112_N$ in FIG. 1 may perform filtering in this manner. Multi-rate digital signal processing techniques include filter bank approaches in which a single input that is sampled at a relatively high rate is successively filtered and reduced (e.g., decimated) until multiple bandpass output signals are provided at the output. Each of the bandpass output signals may be sampled at a relatively low rate appropriate for its bandwidth.

An overview of some exemplary multi-rate digital signal processing techniques is provided in Crochiere and Rabiner, *Multirate Digital Signal Processing*, Prentice-Hall, 1983, the entirety of which is incorporate herein by reference. However, the scope of the present invention is not intended to be limited by any of the exemplary techniques described or referenced herein.

i. Implement Receiver Using Frequency-Domain Techniques

According to a ninth embodiment, receiver functionality is implemented using frequency-domain techniques, rather than or in addition to time-domain techniques. For illustrative purposes, consider again the example of an adaptive equalizer with a symbol rate of 5 Msps per channel, 40 taps per channel, and 16 QAM channels, for a total of 640 complex equalizer taps. In this example, the equalizer may be implemented by taking a fast Fourier transform (FFT) or another type of transform of the wideband signal, producing 640 frequency bins across the 16 QAM channels. Each bin may be multiplied by a single complex tap (or more generally, filtered in a short adaptive filter), implementing a frequency-domain equalizer. The resulting wideband signal is applied to an inverse FFT and channelizing filters, giving 16 equalized output signals. The QAM decisions from each channel may be fed back to train the frequency-domain equalizer. FFT processing of a block of length n generally requires approximately $n*\log(n)$ multiplications. Conventional time domain processing, on the other hand, can require approximately $n^2$ multiplications. Accordingly, frequency domain processing may reduce the overall computational complexity of an equalizer, so long as $n*\log(n)<n^2$. The benefit of this technique becomes greater as n increases.

j. Use Canonical Sign-Digit Techniques

Canonical sign-digit (CSD) techniques are used to reduce the number of multiplications required, for example, according to a tenth embodiment of the present invention. CSD techniques allow the coefficients of a FIR filter, for example, to be replaced with approximate coefficients. Each coefficient, when used in a multiplication, requires a certain number of (e.g., four or fewer) additions or subtractions. Normally CSD coefficients are precomputed for use in fixed FIR filters. In adaptive filters, the coefficients change rapidly, which may hinder computation of the CSD approximations in real time. However, in conjunction with other hardware allocation techniques, such as micro-sharing of resources (see section III.a), block processing (see section III.n), and/or subsampled coefficient updates (see section III.c), it may be advantageous to slightly modify a given coefficient so as to require fewer multiplier slices (e.g., one less multiplier slice). In an aspect, CSD techniques may be used to facilitate modification of a coefficient without adversely affecting the overall response. In another aspect, CSD techniques can be used to convert a coefficient with a relatively large number of additions to a coefficient with a relatively small number of subtractions, or conversely, to convert a coefficient with a relatively large number of subtractions to a coefficient with a relatively small number of additions.

k. Use Serial Digital Filter Techniques

In an eleventh embodiment, serial digital filter techniques are employed. For instance, a digital filter may be effectively divided into a plurality of 1-bit filters. For example, a 16 bit binary number may be represented as the sum of the least significant bit, the next bit times 2, the next bit times 4, . . . , and the last bit times $2^{15}$. These numbers may be expanded and re-combined in accordance with a serial digital filter technique, rather than row by row, or column by column. Some exemplary serial digital filter techniques are provided in Peled, A. and Bede Liu, "A new hardware realization of digital filters," *IEEE Transactions on Acoustics, Speech, and Signal Processing*, Volume 22, Issue 6, Dec. 1974 Pages 456-462, the entirety of which is incorporated herein by reference. These exemplary techniques are referenced for illustrative purposes and are not intended to limit the scope of the present invention.

l. Use Digital Signal Processors to Implement Functionality

According to a twelfth embodiment, signal processing functionality may be implemented using any of a variety of digital signal processors (DSPs), rather than using dedicated equalizers, filters, etc. Some exemplary DSP architectures are discussed below.

1) Traditional DSP Architectures

Traditional DSP architectures (e.g., the TI 320 series and similar) offer full programmability. However, such architectures may not be as power efficient as some other architectures, and/or the area overhead may be relatively large for a relatively small number of channels. Using traditional DSP architectures may necessitate the use of coprocessors or accelerators (e.g., a Viterbi decoder).

2) Multiple Micro DSPs

Morphics (now part of Infineon Technologies AG) is one example of a manufacturer of multiple micro DSPs. Each DSP is relatively small, runs at a lower speed than a traditional super DSP, and is configured to handle specific tasks. This approach offers the flexibility of DSP but with better power efficiency and scalability than traditional DSPs, though interprocessor communication and scheduling may add overhead to the system.

3) A Combination of Micro DSPs and ASICs

This approach resembles a dedicated hardware implementation, but each function is implemented as a dedicated microprocessor that performs a function or group of functions. Examples of this approach include but are not limited to a front-end filter processor, a timing loop processor, an equalizer processor, and a Viterbi decoder processor. Each sample may be tagged by a channel ID to facilitate proper identification of the result. This is essentially a highly time-shared hardware resource approach. Using a combination of micro DSPs and ASICs avoids the short-comings of micro DSPs but can offer the same scalability. It should be noted that this approach may not be power/area efficient for a smaller number of channels. This approach may offer less programmability than traditional DSPs and micro DSPs. The hardware sharing ideas discussed above in section III.a can be applied to the DSP approaches described herein, as well, and especially to this combination approach.

The twelfth embodiment is intended to encompass other combinations of processor based approaches, which may be a combination or variation of the three approaches described above.

m. Use Memory for Storage

Storage may be achieved by using memory, rather than registers (e.g., flip flops), according to a thirteenth embodiment. For example, memory interfaces may be time-shared to reduce bus widths. Sampling may be performed at a relatively high rate (e.g., 400 MHz and above) while time-sharing small cores and memory among many channels. Any logic that runs at a relatively low rate (e.g., the symbol rate) may be removed to the extent possible and replaced with shared cores and memory.

n. Pipeline Processing Blocks

In a fourteenth embodiment, processing blocks are pipelined.

Pipelining includes placing re-clocking registers in processing blocks, so that the clock rate can be increased, though increased latency may result. As an example, if a multiplier operates at 100 MHz, adding a single pipeline register approximately doubles the speed to 200 MHz; adding two pipeline stages increases the speed to 300 MHz; adding three pipeline stages increases the speed to 400 MHz; etc. Pipelined processing blocks may provide a relatively fast multiplier, as an example, which can be shared by a variety of processes.

IV. Other Embodiments

Figure 4:
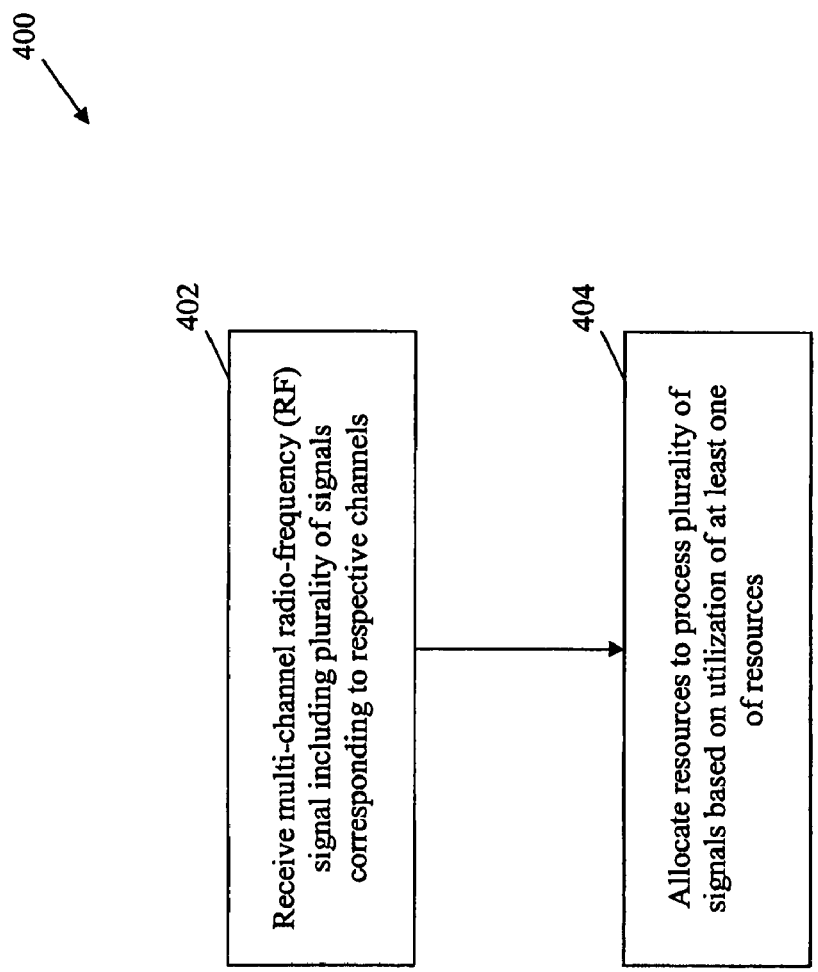
FIG. 4 illustrates a flowchart 400 of an exemplary method for allocating resources in a multi-channel environment according to an embodiment of the present invention.

FIG. 4 illustrates a flowchart 400 of an exemplary method for allocating resources in a multi-channel environment according to an embodiment of the present invention. Any of the hardware allocation techniques described herein may be implemented in accordance with flowchart 400. The invention, however, is not limited to the description provided by the flowchart 400. Rather, it will be apparent to persons skilled in the relevant art(s) from the teachings provided herein that other functional flows are within the scope and spirit of the present invention.

Flowchart 400 will be described with continued reference to exemplary N-channel receiver 100 described above in reference to FIG. 1. The invention, however, is not limited to that embodiment.

Referring now to FIG. 4, a multi-channel RF signal is received at block 402. The multi-channel RF signal includes a plurality of signals corresponding to respective channels. For example, RF tuner 102 may receive the multi-channel RF signal. At block 404, resources are allocated to process the plurality of signals based on utilization of at least one of the resources. For instance, hardware allocation module 108 may allocate the resources.

FIGS. 1-4 are provided for illustrative purposes and are not intended to limit the scope of the present invention. It will be recognized by persons skilled in the relevant art(s) that the hardware allocation techniques described herein are applicable to any multi-channel communication environment.

Referring to FIG. 1, for example, embodiments of the present invention need not necessarily utilize an FEC encoding/decoding algorithm.

For instance, any other suitable type of encoding/decoding may be utilized. In fact, the multi-channel RF signals received by tuner 102 may not be encoded at all. Accordingly, FEC modules 118 may be replaced with another suitable type of decoding module, or signal processing modules 106 may not include decoding modules of any type. Moreover, N-channel receiver 100 may include functionality not shown in FIG. 1. For example, N-channel receiver 100 may be a transceiver.

In FIG. 3, multiplier 302 is shown to be sliced in half only along the coefficient dimension. However, in some embodiments, multiplier 302 is sliced along the data dimension as well as the coefficient dimension. For example, multiplier 302 may be sliced in half along the data dimension as well as the coefficient dimension, so that each datum is divided into two parts, $D=2^8*D_1+D_0$, and each coefficient is divided into two parts, $C=2^8*C_1+C_0$. In this example, the product P includes four partial products corresponding to $D_1*C_1$, $D_1*C_0$, $D_0*C_1$, and $D_0*C_0$. The data and the coefficients are described as being divided into two parts each for illustrative purposes. It will be understood by persons skilled in the relevant art(s) that each datum and/or coefficient may be sliced into any number of parts. Moreover, the data and the coefficients need not necessarily include the same number of slices.

Unless otherwise indicated, the representative hardware allocation techniques described herein may be implemented in hardware, firmware, software, or some combination thereof. For instance, the hardware allocation techniques may be implemented using computer processors, computer logic, application specific integrated circuits (ASIC), digital signal processors, state machines, etc., as will be understood by those skilled in the arts based on the discussion given herein. Accordingly, any processor that performs the hardware allocation techniques described herein is within the scope and spirit of the present invention.

Furthermore, the hardware allocation techniques described herein may be embodied by computer program instructions that are executed by a computer processor or any one of the hardware devices listed above. The computer program instructions cause the processor to perform the hardware allocation techniques described herein. The computer program instructions (e.g., software) may be stored in a computer usable medium, computer program medium, or any storage medium that can be accessed by a computer or processor. Such media include a memory device such as a RAM or ROM, or other type of computer storage medium such as a computer disk or CD ROM, or the equivalent. Accordingly, any computer storage medium having computer program code that cause a processor to perform the signal processing functions described herein are within the scope and spirit of the present invention.

V. Conclusion

Example embodiments of the methods, systems, and components of the present invention have been described herein.

As noted elsewhere, these example embodiments have been described for illustrative purposes only, and are not limiting. Other embodiments are possible and are covered by the invention. Such other embodiments will be apparent to persons skilled in the relevant art(s) based on the teachings contained herein. Thus, the breadth and scope of the present invention should not be limited by any of the above described exemplary embodiments, but should be defined only in accordance with the following claims and their equivalents.

What is claimed is:

1. A receiver, comprising:
   a tuner to receive a multi-channel radio-frequency (RF) signal including a plurality of signals corresponding to respective channels;
   a plurality of signal processing modules corresponding to respective signals of the multi-channel RF signal, each signal processing module including a hardware element; and
   a hardware allocation module to allocate the hardware elements for processing the plurality of signals based on utilization of at least one of the hardware elements;
   wherein at least one hardware element includes an M-bit multiplier, wherein the hardware allocation module configures the M-bit multiplier to perform multiplication on L-bit multiplicands, and wherein L<M.

2. The receiver of claim 1, wherein L=M/P, and wherein P is an integer.

3. The receiver of claim 1, wherein the hardware allocation module prioritizes L-bit multiplicands and discards at least one relatively low priority L-bit multiplicand.

4. The receiver of claim 1, wherein the hardware allocation module allocates a first portion of a first hardware element to a first user and a second portion of the first hardware element to a second user during a clock cycle.

5. The receiver of claim 1, wherein the hardware allocation module effectively divides each of the hardware elements into bit slices.

6. The receiver of claim 5, wherein the hardware allocation module allocates the hardware elements to reduce a number of bit slices allocated to a user in order to facilitate fulfillment of requests received from another user.

7. The receiver of claim 5, wherein the hardware allocation module defers allocation of a hardware element for a first operation based on utilization of the hardware element for a second operation.

8. The receiver of claim 5, wherein the hardware allocation module allocates the bit slices based on sensitivity of users to allocation of fewer than all requested bit slices.

9. The receiver of claim 1, wherein a first signal corresponding to a first channel includes a plurality of symbols, wherein the hardware element corresponding to the first channel includes an equalizer, and wherein the hardware allocation module allocates the hardware element corresponding to the first channel to update at least one coefficient of the equalizer less than once per symbol.

10. The receiver of claim 9, wherein the hardware allocation module allocates the hardware element corresponding to the first channel to update one coefficient per M symbols, and wherein M is an integer greater than one.

11. The receiver of claim 9, wherein the hardware allocation module allocates the hardware element corresponding to the first channel to update L coefficients at M symbol increments, and wherein L and M are integers greater than one.

12. The receiver of claim 9, wherein the hardware allocation module allocates the hardware element corresponding to the first channel to update all of the coefficients of the equalizer at M symbol increments, and wherein M is an integer greater than one.

13. The receiver of claim 9, wherein the hardware allocation module allocates the hardware element corresponding to the first channel to update the coefficients relatively more frequently during acquisition than during tracking.

14. The receiver of claim 9, wherein the hardware allocation module allocates the hardware element corresponding to the first channel to update relatively larger coefficients more frequently than relatively smaller coefficients.

15. The receiver of claim 1, wherein each of the plurality of signals includes a plurality of symbols, wherein the hardware elements include respective equalizers, and wherein the hardware allocation module allocates the hardware elements to selectively update coefficients of the respective equalizers.

16. The receiver of claim 15, wherein the hardware allocation module allocates the hardware elements to selectively update the coefficients of the respective equalizers based on a threshold associated with a magnitude of change represented by the update.

17. The receiver of claim 15, wherein the respective updates include quadrature components having respective first and second magnitudes, and wherein the hardware allocation module allocates the hardware elements to selectively update the coefficients of the respective equalizers based on a comparison of a threshold and the greater of the first and second magnitudes.

18. The receiver of claim 1, wherein at least one of the hardware elements includes an equalizer that utilizes an error signal having four or fewer bits.

19. The receiver of claim 1, wherein at least one of the hardware elements includes an equalizer that utilizes an error signal represented using a block floating point technique.

20. The receiver of claim 1, wherein the signal processing modules are configured to utilize non-binary logic.

21. The receiver of claim 20, wherein the signal processing modules are configured to utilize quaternary logic.

22. The receiver of claim 1, wherein at least one of the hardware elements includes a multiplier that is configured to implement complex multiplications using three real multiplications.

23. The receiver of claim 1, wherein at least one of the signal processing modules includes a front-end that filters a respective signal of the plurality of signals using a multi-rate digital signal processing technique.

24. The receiver of claim 1, wherein at least one of the signal processing modules includes an equalizer that is configured to process a signal of the plurality of signals using a frequency-domain technique.

25. The receiver of claim 1, wherein at least one of the signal processing modules includes a filter, and wherein the at least one signal processing module is configured to utilize a canonical sign-digit technique to approximate a coefficient of the filter.

26. The receiver of claim 1, wherein at least one of the signal processing modules includes a filter having a canonical structure.

27. The receiver of claim 1, wherein at least one of the signal processing modules includes a filter having an inverse canonical structure.

28. The receiver of claim 1, wherein at least one of the signal processing modules includes a filter having a scanned multiplier-accumulator structure.

29. The receiver of claim 1, wherein at least one of the signal processing modules includes a filter configured to operate in accordance with a serial digital filter technique.

30. The receiver of claim 1, wherein each of the signal processing modules is implemented using traditional digital signal processing (DSP) architectures.

31. The receiver of claim 1, wherein each of the signal processing modules is implemented using a plurality of micro digital signal processors (DSPs).

32. The receiver of claim 1, wherein each of the signal processing modules is implemented using a plurality of micro digital signal processors (DSPs) and a plurality of application specific integrated circuits (ASICs).

* * * * *